United States Patent
Subbotin

(10) Patent No.: US 8,218,898 B2
(45) Date of Patent: *Jul. 10, 2012

(54) METHOD AND APPARATUS PROVIDING NOISE REDUCTION WHILE PRESERVING EDGES FOR IMAGERS

(75) Inventor: Igor Subbotin, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/040,648

(22) Filed: Mar. 4, 2011

(65) Prior Publication Data

US 2011/0149122 A1  Jun. 23, 2011

Related U.S. Application Data

(63) Continuation of application No. 11/295,445, filed on Dec. 7, 2005, now Pat. No. 7,929,798.

(51) Int. Cl.
*G06K 9/38* (2006.01)
*G06K 9/40* (2006.01)
*H04N 9/64* (2006.01)

(52) U.S. Cl. ......... 382/275; 382/272; 382/270; 348/250

(58) Field of Classification Search .................. 382/242, 382/275, 272, 270; 348/E09.037, 250

See application file for complete search history.

(56) References Cited

U.S. PATENT DOCUMENTS

| | | | |
|---|---|---|---|
| 3,009,016 A | 11/1961 | Graham | 348/671 |
| 4,023,199 A | 5/1977 | Netravali et al. | 375/240.25 |
| 4,581,588 A | 4/1986 | Schreiber | 330/107 |
| 5,432,869 A | 7/1995 | Matsumoto et al. | 382/274 |
| 5,706,355 A | 1/1998 | Raboisson et al. | 382/104 |
| 5,742,355 A | 4/1998 | De Haan et al. | 348/607 |
| 5,799,111 A | 8/1998 | Guissin | 382/254 |
| 6,229,578 B1 | 5/2001 | Acharya et al. | 348/607 |
| 6,515,285 B1 | 2/2003 | Marshall et al. | 250/352 |
| 6,625,325 B2 | 9/2003 | Gindele et al. | |
| 6,757,442 B1 | 6/2004 | Avinash | 382/274 |
| 6,934,056 B2 | 8/2005 | Gindele et al. | 358/1.9 |
| 6,990,249 B2 | 1/2006 | Nomura | 382/254 |

(Continued)

FOREIGN PATENT DOCUMENTS

JP  6-86104 A  3/1994

(Continued)

OTHER PUBLICATIONS

G. De Haan et al.; "Memory Integrated Noise Reduction IC for Television", IEEE Transactions on Consumer Electronics; vol. 42, No. 2, May 1996; pp. 175-181; The Netherlands.

(Continued)

*Primary Examiner* — Michelle Entezari

(74) *Attorney, Agent, or Firm* — Dickstein Shapiro LLP

(57) ABSTRACT

A method of reducing noise in an image including steps for obtaining a first value for a target pixel, obtaining a respective second value for each neighboring pixel surrounding the target pixel and having the same color as the target pixel, for each neighboring pixel, comparing a difference between said first value and said second value to a threshold value, and replacing the first value with an average value obtained from the first value and at all second values from the neighboring pixels which have an associated difference which is less than or equal to the threshold value based on a result of the comparing step.

17 Claims, 7 Drawing Sheets

U.S. PATENT DOCUMENTS

| | | | |
|---|---|---|---|
| 7,031,543 B2 | 4/2006 | Cheng et al. | 382/254 |
| 7,336,850 B2 | 2/2008 | Jo | 382/275 |
| 7,426,314 B2 | 9/2008 | Kimbell et al. | 382/260 |
| 7,551,799 B2 | 6/2009 | Rai et al. | 348/246 |
| 7,580,589 B2 | 8/2009 | Bosco et al. | 382/275 |
| 7,683,948 B2 | 3/2010 | Yanof et al. | 348/246 |
| 7,756,355 B2 | 7/2010 | Kryda et al. | 382/275 |
| 2002/0105579 A1 | 8/2002 | Levine et al. | 348/187 |
| 2002/0126892 A1 | 9/2002 | Gindele et al. | |
| 2002/0158192 A1 | 10/2002 | Gann | 250/234 |
| 2003/0035586 A1 | 2/2003 | Chou et al. | 382/233 |
| 2003/0048958 A1* | 3/2003 | Ishiguro | 382/261 |
| 2004/0070677 A1 | 4/2004 | Adams et al. | 348/222.1 |
| 2004/0071363 A1 | 4/2004 | Kouri et al. | 382/276 |
| 2004/0109069 A1 | 6/2004 | Kaplinsky et al. | 348/226.1 |
| 2004/0165662 A1 | 8/2004 | Battistella | 375/240.01 |
| 2004/0212705 A1 | 10/2004 | Hsieh | 348/272 |
| 2005/0162531 A1 | 7/2005 | Hsu et al. | 348/222.1 |
| 2006/0133564 A1 | 6/2006 | Langan et al. | 378/8 |
| 2006/0221226 A1 | 10/2006 | Yanof et al. | 348/346 |
| 2006/0228036 A1 | 10/2006 | Avinash | 382/254 |
| 2007/0176862 A1 | 8/2007 | Kurt et al. | 345/82 |
| 2008/0043124 A1 | 2/2008 | Subbotin | 348/250 |

FOREIGN PATENT DOCUMENTS

| | | |
|---|---|---|
| JP | 2003-179779 A | 6/2003 |
| JP | 2004-159055 A | 6/2004 |
| JP | 2005-318498 A | 11/2005 |
| JP | 2006-60744 A | 3/2006 |
| WO | WO/02/102086 A2 | 12/2002 |
| WO | WO/02/102086 A3 | 12/2002 |

OTHER PUBLICATIONS

Jong-Sen Lee; "Digital Image Smoothing and the Sigma Filter"; Computer Vision Graphics and Image Processing; vol. 24; 1983; Academic Press; pp. 255-269; Duluth, MA.

G. de Haan et al., "Memory Integrated Noise Reduction IC for Television" IEEE Transactions on Consumer Electronics, vol. 42, No. 2, pp. 175-181, May 1996.

Preliminary Report on Patentability and Written Opinion (8 pages).

* cited by examiner

| | | | | | |
|---|---|---|---|---|---|
| 10 | 11 | 12 | 13 | 14 | 15 |
| 20 | 21 | 22 | 23 | 24 | 25 |
| 30 | 31 | 32a | 33 | 34 | 35 |
| 40 | 41 | 42 | 43 | 44 | 45 |
| 50 | 51 | 52 | 53 | 54 | 55 |
| 60 | 61 | 62 | 63 | 64 | 65 |

FIG. 2A

| 10 | 11 | 12 | 13 | 14 | 15 |
|---|---|---|---|---|---|
| 20 | 21 | 22 | 23 | 24 | 25 |
| 30 | 31 | 32b | 33 | 34 | 35 |
| 40 | 41 | 42 | 43 | 44 | 45 |
| 50 | 51 | 52 | 53 | 54 | 55 |
| 60 | 61 | 62 | 63 | 64 | 65 |

FIG. 2B

METHOD AND APPARATUS PROVIDING NOISE REDUCTION WHILE PRESERVING EDGES FOR IMAGERS

This application is a continuation of U.S. patent application Ser. No. 11/295,445 filed Dec. 7, 2005, now U.S. Pat. No. 7,929,798 now allowed, which is hereby incorporated herein by reference in its entirety.

FIELD OF THE INVENTION

The invention relates generally to the field of solid state imager devices, and more particularly to a method and apparatus for noise reduction in a solid state imager device.

BACKGROUND OF THE INVENTION

Solid state imagers, including charge coupled devices (CCD), CMOS imagers and others, have been used in photo imaging applications. A solid state imager circuit includes a focal plane array of pixel cells, each one of the cells including a photosensor, which may be a photogate, photoconductor or a photodiode having a doped region for accumulating photo-generated charge.

One of the most challenging problems for solid state image sensors is noise reduction, especially for sensors with a small pixel size. The effect of noise on image quality increases as pixel sizes continue to decrease and may have a severe impact on image quality. Specifically, noise impacts image quality in smaller pixels because of reduced dynamic range. One of the ways of solving this problem is by improving fabrication processes; the costs associated with such improvements, however, are high. Accordingly, engineers often focus on other methods of noise reduction. One such solution applies noise filters during image processing. There are many complicated noise reduction algorithms which reduce noise in the picture without edge blurring, however, they require huge calculating resources and cannot be implemented in a silicon-on-a-chip application. Most simple noise reduction algorithms which blur the edges of the images.

Two exemplary methods that may be used for image denoising are briefly discussed herein. The first method includes the use of local smoothing filters, which work by applying a local low-pass filter to reduce the noise component in the image. Typical examples of such filters include averaging, medium and Gaussian filters. One problem associated with local smoothing filters is that they do not distinguish between high frequency components that are part of the image and those created due to noise. As a result, these filters not only remove noise but also blur the edges of the image.

A second group of denoising methods work in the spatial frequency domain. These methods typically first convert the image data into a frequency space (forward transform), then filter the transformed image and finally convert the image back into the image space (reverse transform). Typical examples of such filters include DFT filters and wavelength transform filters. The utilization of these filters for image denoising, however, is impeded by the large volume of calculations required to process the image data. Additionally, block artifacts and oscillations may result from the use of these filters to reduce noise. Further, these filters are best implemented in a YUV color space (Y is the luminance component and U and V are the chrominance components). Accordingly, there is a need and desire for an efficient image denoising method and apparatus which do not blur the edges of the image.

BRIEF SUMMARY OF THE INVENTION

The invention, in various exemplary embodiments, relates to a method and apparatus that allows for image denoising in an imaging device.

In accordance with exemplary embodiments of the invention, a method and implementing apparatus for reducing noise in image processing includes steps for obtaining a first value for a target pixel, obtaining a respective second value for each neighboring pixel surrounding the target pixel and having the same color as the target pixel, for each neighboring pixel, comparing a difference between said first value and said second value to a threshold value, and replacing the first value with an average value obtained from the first value and at all second values from the neighboring pixels which have an associated difference which is less than or equal to the threshold value based on a result of the comparing step.

The exemplary noise filter could be applied either to each color separately in Bayer, Red/Green/Blue (RGB), Cyan/Magenta/Yellow/Key (CMYK), luminance/chrominance (YUV), or other color space. The invention sets a noise amplitude threshold (TH), which may be a function of analog and digital gains that may have been applied to amplify the original signal. Only noise that has amplitude of dispersion (the difference between the average maximum and minimum value) lower than a noise amplitude threshold (TH) will be averaged and reduced. Therefore, edges having a signal lower than the threshold will be averaged and blurred. The invention accomplishes this by processing a central target pixel by averaging it with all its like color neighbors that produce a signal difference less than the set threshold.

BRIEF DESCRIPTION OF THE DRAWINGS

The foregoing and other advantages and features of the invention will be more readily understood from the following detailed description of the invention provided below with reference to the accompanying drawings, in which:

FIG. 2A depicts an image correction kernel for a red or blue pixel of a pixel array in accordance with the invention;

FIG. 2B depicts a correction kernel for a green pixel of a pixel array in accordance with the invention;

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of the embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor device and associated structures for converting photons to an electrical signal. For purposes of illustration, a small representative three-color pixel array is illustrated in the figures and description herein. However, the invention may be applied to monochromatic imagers as well as to imagers for sensing fewer than three or more than three color components in an array. Accordingly, the following detailed description is not to be taken in a limiting sense, and the scope of the present invention is defined only by the appended claims.

Figure 1:
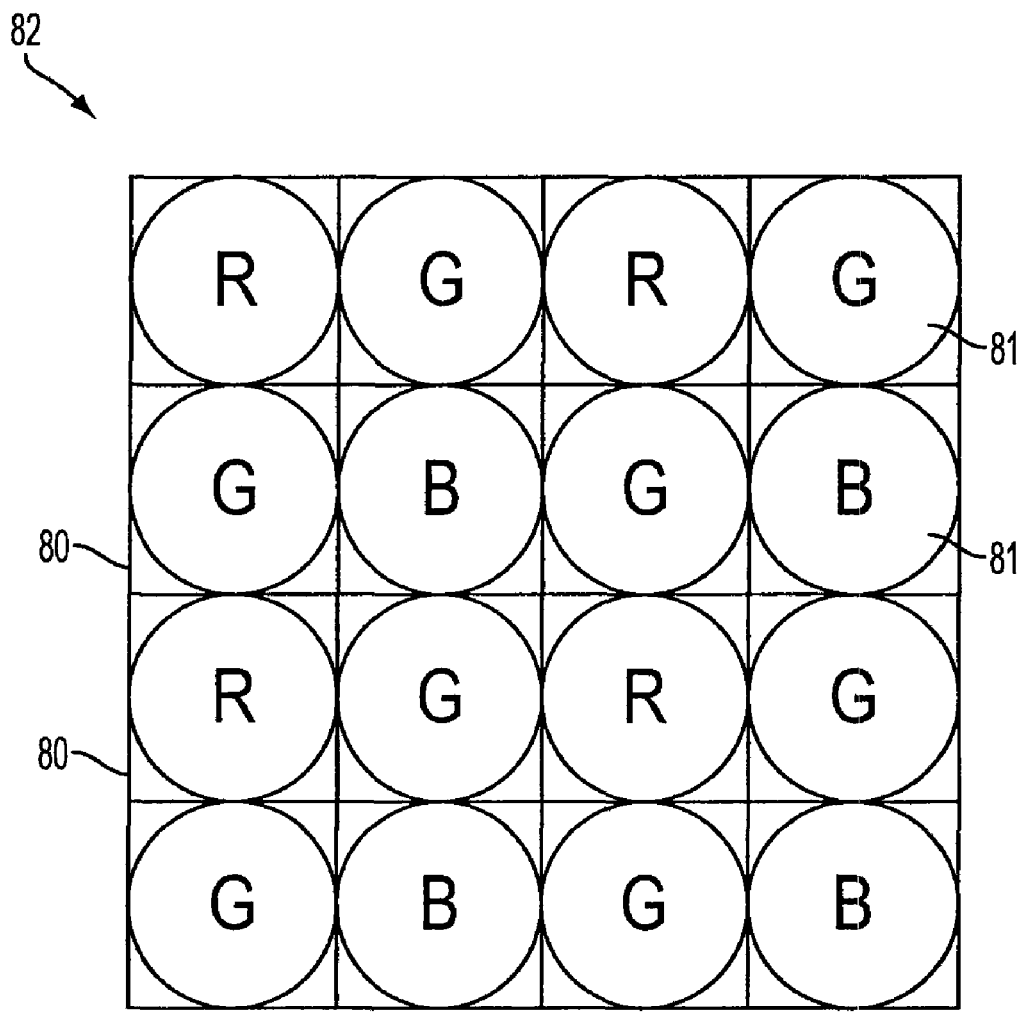
FIG. 1 is a top-down view of a conventional microlens and color filter array used in connection with a pixel array.

FIG. 1 depicts one exemplary conventional color filter array, arranged in a Bayer pattern, covering a pixel array to focus incoming light. It should be understood that, taken alone, a pixel generally does not distinguish one incoming color of light from another and its output signal represents only the intensity of light received, not any identification of color. However, pixels 80, as discussed herein, are referred to by color (i.e., "red pixel," "blue pixel," etc.) when a color filter 81 is used in connection with the pixel array to focus a particular wavelength range of light, corresponding to a particular color, onto the pixels 80. Accordingly, when the term "red pixel" is used herein, it is referring to a pixel associated with and receiving light through a red color filter; when the term "blue pixel" is used herein, it is referring to a pixel associated with and receiving light through a blue color filter; and when the term "green pixel" is used herein, it is referring to a pixel associated with and receiving light through a green color filter.

Figures, FIGS. 2A and 2B illustrate parts of pixel array 100 having an identified target pixel 32a, 32b that may undergo a corrective method in accordance with the invention. The identified target pixel 32a shown in FIG. 2A in pixel array 100 may be either a red or a blue pixel. Pixel array 100 shown in FIG. 2B has an identified pixel 32b that is a green pixel. The invention may also use one kernel applied to four color channels: red pixels, blue pixels, green pixels in a red row, and green pixels in a blue row.

In the illustrated examples, it is assumed that the pixel array 100 is associated with a Bayer pattern color filter array 82 (FIG. 1); however, the invention may also be used with other color filter patterns. The color filters 81 focus incoming light of a particular wavelength range onto the underlying pixels 80. In the Bayer pattern, as illustrated in FIG. 1, every other pixel array row consists of alternating red (R) and green (G) colored pixels, while the other rows consist of alternating green (G) and blue (B) color pixels.

According to exemplary embodiments of the invention, to denoise pixels, the present invention utilizes signal values of the nearest neighboring pixels of the identified target pixel 32a, 32b. The identified target pixel 32a, 32b is the pixel currently being processed. The neighboring pixels are collectively referred to herein as an image kernel, shown in FIGS. 2A and 2B respectively as kernels 101a, 101b. A total of eight neighboring pixels are included in each kernel 101a, 101b. It should be noted, that the illustrated correction kernels 101a, 101b are exemplary, and that other correction kernels may be chosen for pixel arrays using color filter patterns other than the Bayer pattern. In addition, a correction kernel could encompass more or less than eight neighboring pixels, if desired.

Figure 3:
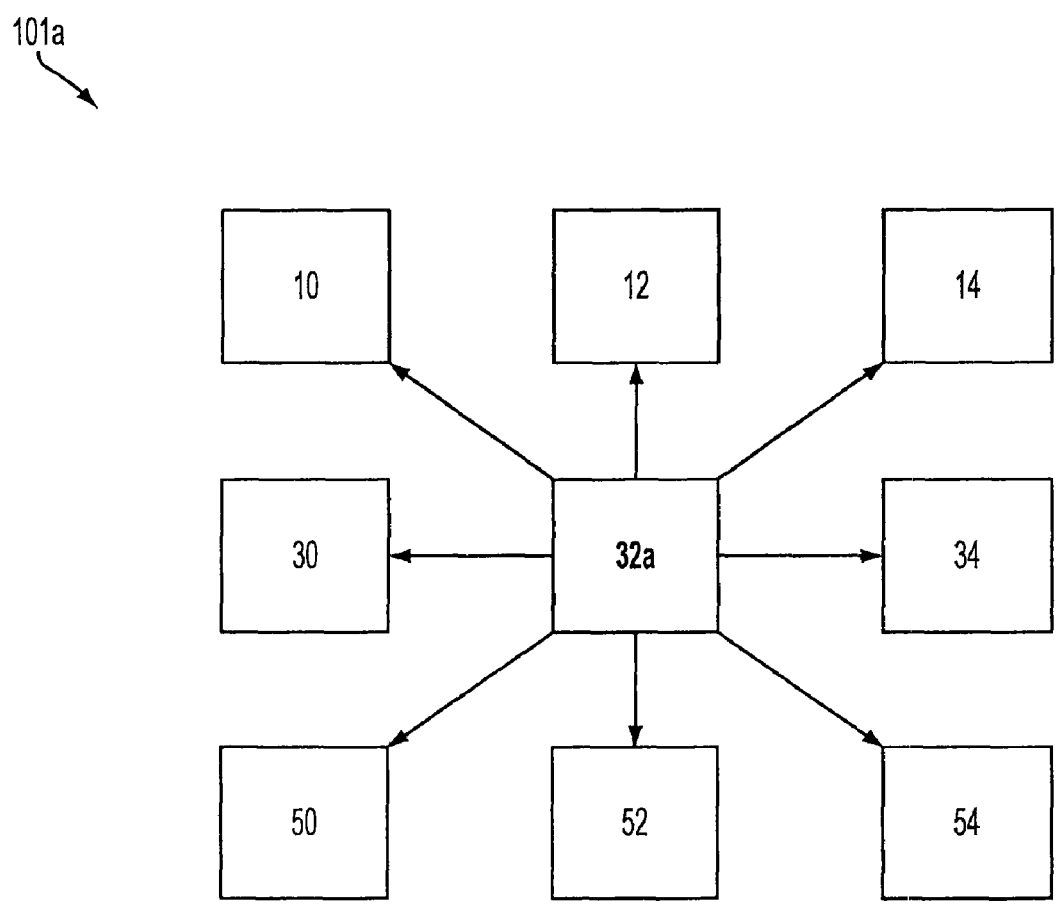
FIG. 3 depicts the correction kernel of FIG. 2A in more detail.

In FIGS. 2A and 2B, the exemplary correction kernels 101a, 101b are outlined with a dotted line. For kernel 101a there are eight pixels (pixels 10, 12, 14, 34, 54, 52, 50, and 30) having the same color as the identified target pixel 32a. Although it appears that correction kernel 101a contains sixteen pixels, it should be noted that half of the pixels are green pixels, whose signals would not be considered for use in denoising of a red or blue target pixel 32a. The actual pixels that make up kernel 101a are shown in greater detail in FIG. 3. Kernel 101b also includes eight pixels (pixels 12, 23, 34, 43, 52, 41, 30, and 21) having the same green color as the identified pixel 32b.

Figure 4:
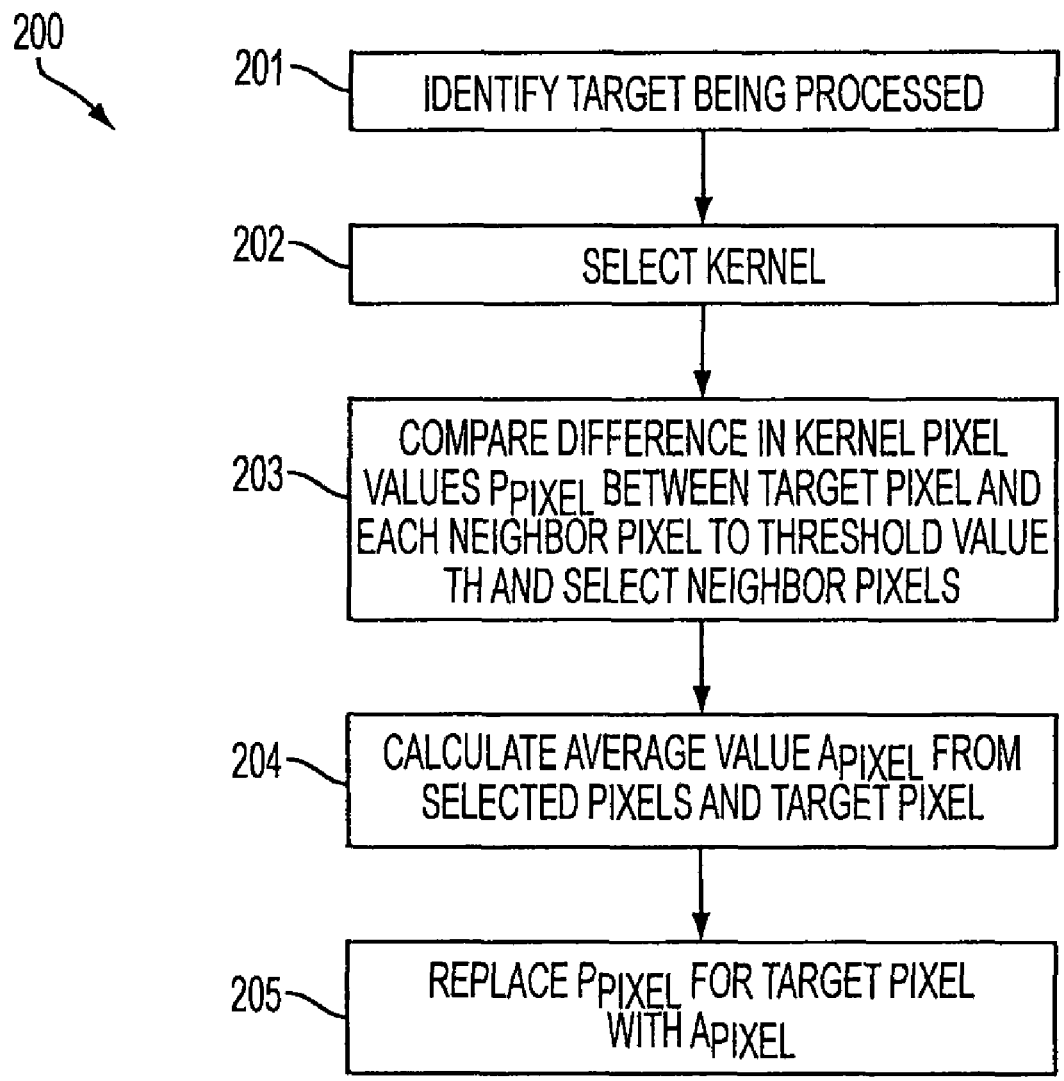
FIG. 4 shows a flowchart of a method for removing pixel noise in accordance with an exemplary method of the invention.

With reference to FIG. 4, an exemplary method 200 of the present invention is now described. The method can be carried out by an image processing circuit 280 (described below with reference to FIG. 5). It should be understood that each pixel has a value that represents an amount of light received at the pixel. Although representative of a readout signal from the pixel, the value is a digitized representation of the readout analog signal. These values are represented in the following description as P(pixel) where "P" is the value and "(pixel)" is the pixel number shown in FIG. 2A or 2B. For explanation purposes only, the method 200 is described with reference to the kernel 101a and target pixel 32a as illustrated in FIG. 2A.

Initially, at step 201, the target pixel 32a being processed is identified. Next, at step 202, the kernel 101a associated with the target pixel 32a is selected/identified. After the associated kernel 101a is selected, at step 203, the difference in values P(pixel) of the central (processed) pixel 32a and each neighboring pixel 10, 12, 14, 30, 34, 50, 52, 54 in kernel 101a are compared with a threshold value TH. The threshold value TH may be preselected, for example, using noise levels from current gain settings, or using other appropriate methods. In the illustrated example, at step 203, neighboring pixels that have a difference in value P(pixel) less than or equal to the threshold value TH are selected. For exemplary purposes only, the value could be the red value if target pixel 32a is a red pixel.

Next, at step 204, a value P(pixel) for each of the kernel pixels located around the target pixel 32a, which were selected in step 203, are added to a corresponding value for the target pixel 32a and an average value A(pixel) is calculated. For example, for target pixel 32a, the average value $A32=(P10+P12+P14+P30+P32a+P34+P50+P52+P54)/9$ is calculated, if all eight neighboring pixels were selected in step 203. At step 205, the calculated value A(pixel), which is, in this example, A32, replaces the original target pixel value P32a.

The method described herein may be carried out on each pixel signal as it is processed. As pixels values are denoised, the values of previously denoised pixels may be used to denoise other pixel values. Thereby, when the method described herein and the values of previously denoised pixels are used to denoise other pixels, the method and apparatus is implemented in a partially recursive manner (pixels are denoised using values from previously denoised pixels). However, the invention is not limited to this implementation and may be implemented in a fully recursive (pixels are denoised using values from other denoised pixels) or non-recursive manner (no pixels having been denoised are used to denoise subsequent pixels).

The method 200 described above may also be implemented and carried out, as discussed above, on target pixel 32b and associated image correction kernel 101b. For example, in step 202 the kernel 101b is selected/identified. After the associated kernel 101b is selected for target pixel 32b, the differences in values between each of the neighboring pixels 12, 21, 23, 30,

34, 41, 43, 52 in kernel 101*b* located around target pixel 32*b* and the value of target pixel 32*b* are compared to a threshold TH in step 203. The remaining steps 204, 205 are carried out as discussed above for the pixels corresponding to kernel 101*b*.

The above described embodiments may not provide sufficient denoising to remove spurious noise (i.e., noise greater than 6 standard deviations). Accordingly, the invention is better utilized when implemented after the image data has been processed by a filter which will remove spurious noise.

The invention is not limited to the above described embodiments. For example, a program embodying the method may be stored on a carrier medium which may include RAM, floppy disk, data transmission, compact disk, etc. and then be executed by an associated processor. For example, the invention may be implemented as a plug-in for existing software applications or it may used on its own. The invention is not limited to the carrier mediums specified herein and the invention may be implemented using any carrier medium as known in the art.

Figure 5:
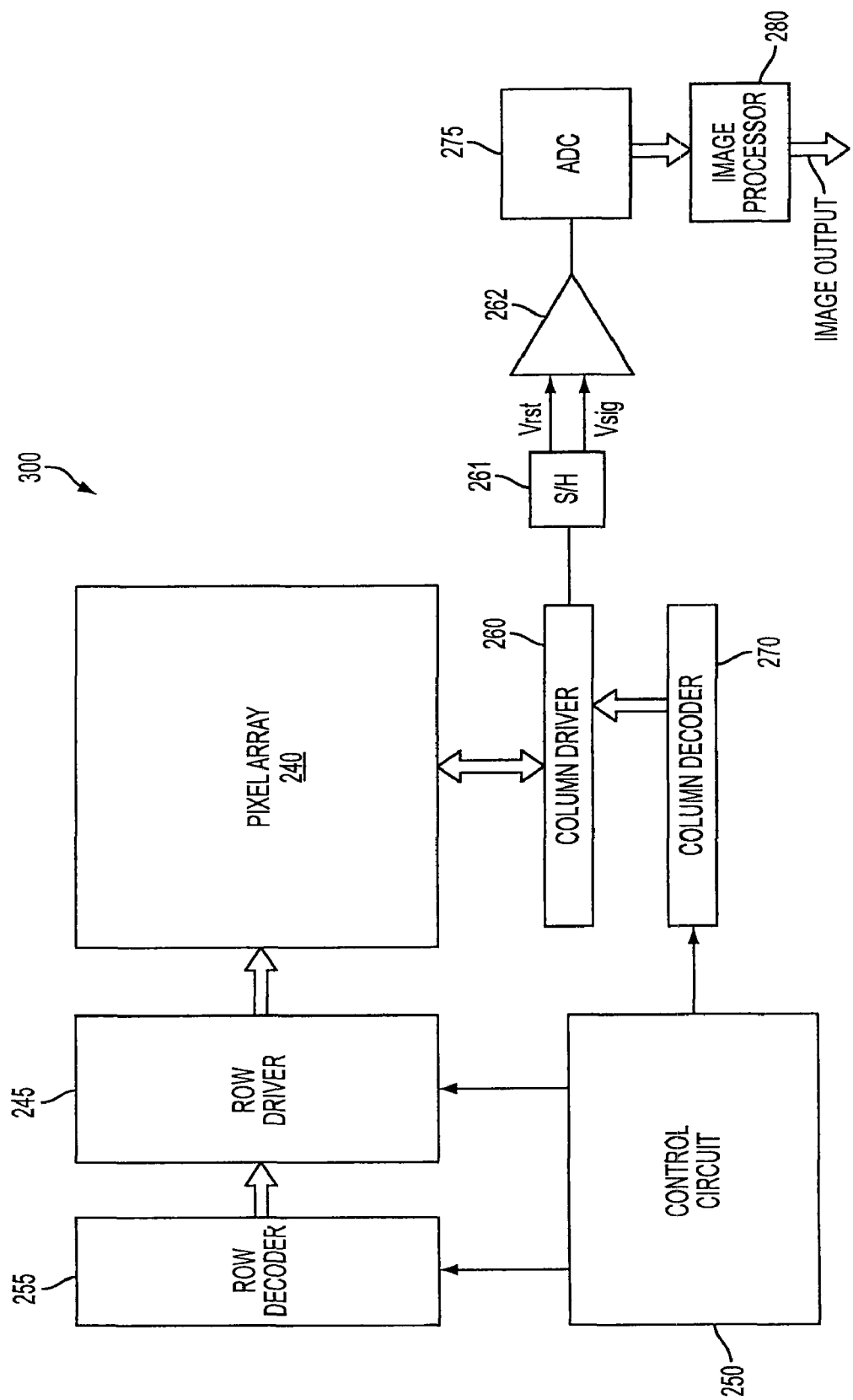
FIG. 5 shows a block diagram of an imager constructed in accordance with an exemplary embodiment of the invention.

FIG. 5 illustrates an exemplary imaging device 300 having an exemplary CMOS pixel array 240. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst-Vsig) is produced by differential amplifier 262 for each pixel and is digitized by analog-to-digital converter 275 (ADC). The analog-to-digital converter 275 supplies the digitized pixel signals to an image processor 280 which forms and may output a digital image. The image processor 280 runs a program that is capable of performing the method 200 (FIG. 4) on the digitized signals from the pixel array 240. Alternatively, processing can be done on the analog output of the pixel array by a hardwired circuit located between the amplifier 262 and ADC 275.

The exemplary noise filter could be applied either to each color separately in Bayer, Red/Green/Blue (RGB), Cyan/Magenta/Yellow/Key (CMYK), luminance/chrominance (YUV), or other color space. The invention sets a noise amplitude threshold (TH), which may be a function of analog and digital gains that may have been applied to amplify the original signal. Only noise that has amplitude of dispersion (the difference between the average maximum and minimum value) lower than a noise amplitude threshold (TH) will be averaged and reduced. Therefore, edges having a signal lower than the threshold will be averaged and blurred. The invention accomplishes this by processing a central target pixel by averaging it with all its like color neighbors that produce a signal difference less than or equal to the set threshold.

Figure 6:
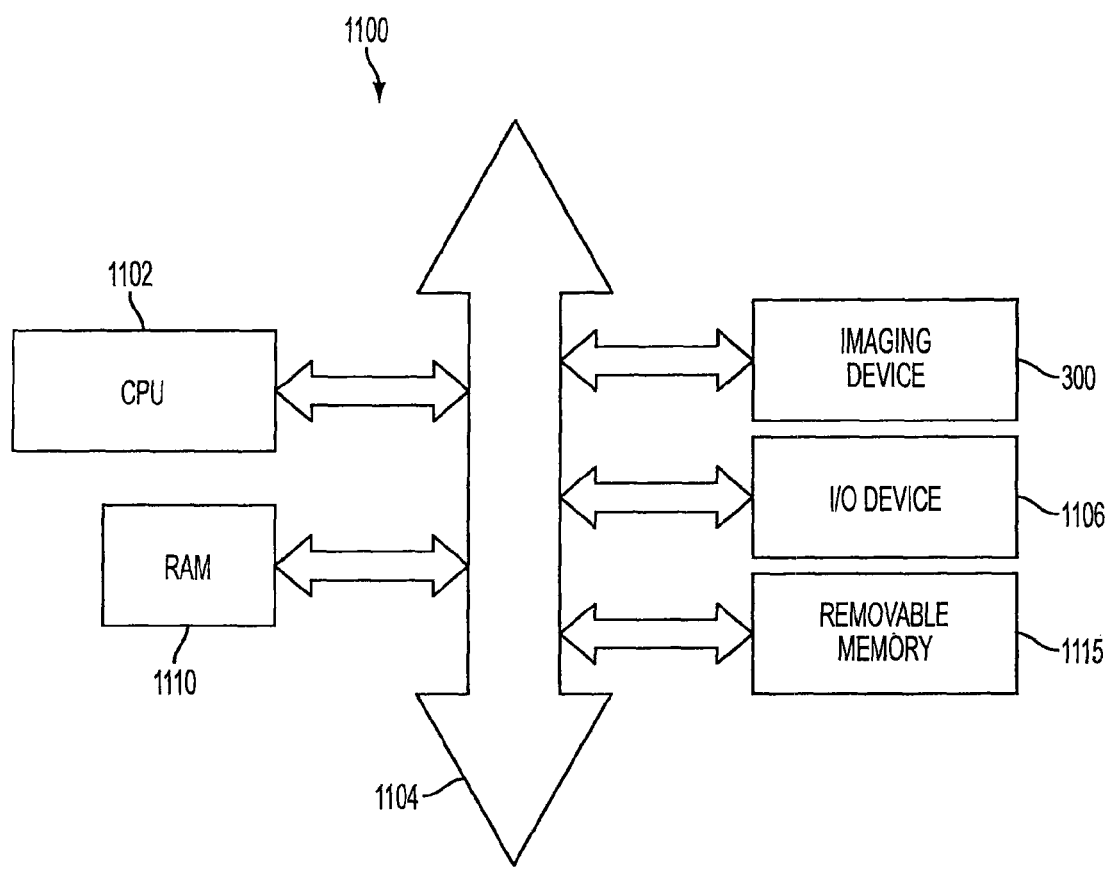
FIG. 6 shows a processor system incorporating at least one imaging device constructed in accordance with an embodiment of the invention.

FIG. 6 shows system 1100, a typical processor system modified to include the imaging device 300 (FIG. 5) of the invention. The system 1100 is exemplary of a system having digital circuits that could include image sensor devices. Without being limiting, such a system could include a computer system, still or video camera system, scanner, machine vision, video phone, and auto focus system, or other imager systems.

System 1100, for example a camera system, generally comprises a central processing unit (CPU) 1102, such as a microprocessor, that communicates with an input/output (I/O) device 1106 over a bus 1104. Imaging device 300 also communicates with the CPU 1102 over the bus 1104. The processor-based system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the methods can be used with pixels in other patterns than the described Bayer pattern, and the correction kernels would be adjusted accordingly. In addition, the invention is not limited to the type of imager device in which it is used. Thus, the invention is not to be seen as limited by the foregoing description, but is only limited by the scope of the appended claims.

What is claimed as new and desired to be protected by Letters Patent of the United States is:

1. A method of reducing noise in a image comprising, for each pixel in the image, the steps of:
   calculating a difference between a value of a target pixel and a value of each same-color neighboring pixel surrounding the target pixel, and
   replacing the value of the target pixel with an average value calculated from the value of the target pixel along with values from each of the same-color neighboring pixels which have an associated difference that is less than or equal to a noise amplitude threshold,
   wherein pixels are denoised sequentially, such that values of any previously de-noised, same-color neighboring pixels are used in replacing the value of the target pixel.

2. The method of claim 1, wherein the noise amplitude threshold is selected as a function of analog or digital gains applied to amplify pixels signals in the image.

3. The method of claim 1, wherein denoised values are first determined for each pixel in the image and then the calculating and replacing steps are performed for each pixel using the denoised values.

4. The method of claim 1, wherein the image is a bayer pattern image.

5. The method of claim 4, wherein the target pixels are divided into color channels and processed separately.

6. The method of claim 5, wherein there are four color channels: red, blue, green pixels in red rows, and green pixels in blue rows.

7. A method of reducing noise in an image comprising, for each pixel in the image, the steps of:
   selecting a set of pixels surrounding an identified target pixel;
   for each same-color neighboring pixel of the set, calculating a respective difference value between said target pixel and the same-color neighboring pixel;
   substituting an average value as a value for the target pixel, wherein said average value is based on the value of said target pixel along with values of each same-color neighboring pixel that has a respective difference value less than or equal to a noise amplitude threshold, wherein pixels are denoised sequentially, such that the calculating, determining and substituting steps comprise using values of any previously de-noised same-color neighboring pixels.

8. The method of claim 7, wherein the image is a bayer pattern image.

9. The method of claim 8, wherein the set of pixels comprises the eight same-color pixels surrounding an identified target pixel.

10. The method of claim 8, wherein pixels in the image are divided into four color channels: red, blue, green pixels in red rows, and green pixels in blue rows.

11. An imaging device comprising:
- a pixel array comprising a plurality of pixels, each pixel outputting a signal representing an amount of light received; and
- a denoising circuit for denoising an image comprising pixel signals obtained from the pixel array, the denoising circuit being configured to perform a denoising operation comprising:
- calculating a difference between a value of a target pixel and a value of each same-color neighboring pixel surrounding the target pixel, and
- replacing the value of the target pixel with an average value calculated from the value of the target pixel along with values from each of the same-color neighboring pixels which have an associated difference that is less than or equal to a noise amplitude threshold,
- wherein the values of any previously de-noised, same-color neighboring pixels are used in replacing the value of the target pixel.

12. The imaging device of claim 11, wherein the noise amplitude threshold is selected as a function of analog or digital gains applied to amplify pixels signals in the image.

13. The imaging device of claim 11, wherein pixels are denoised sequentially.

14. The imaging device of claim 11, wherein denoised values are first determined for each pixel in the image and then the calculating and replacing steps are performed for each pixel using the denoised values.

15. The imaging device of claim 13, wherein the image is a bayer pattern image.

16. The imaging device of claim 15, wherein the target pixels are divided into color channels and processed separately.

17. The imaging device of claim 16, wherein there are four color channels: red, blue, green pixels in red rows, and green pixels in blue rows.

* * * * *